(12) United States Patent
Takamori et al.

(10) Patent No.: US 10,477,053 B2
(45) Date of Patent: Nov. 12, 2019

(54) IMAGE READING APPARATUS AND IMAGE READING METHOD FOR READING DOCUMENT WITH READER SUPPORTED BY COPYHOLDER

(71) Applicant: PFU LIMITED, Ishikawa (JP)

(72) Inventors: Masaya Takamori, Ishikawa (JP); Yuki Kasahara, Ishikawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 16/030,820

(22) Filed: Jul. 9, 2018

(65) Prior Publication Data

US 2018/0324315 A1 Nov. 8, 2018

Related U.S. Application Data

(63) Continuation of application No. PCT/JP2019/053394, filed on Feb. 4, 2016.

(51) Int. Cl.
*H04N 1/00* (2006.01)
*H04N 1/10* (2006.01)
*H04N 1/23* (2006.01)

(52) U.S. Cl.
CPC ..... *H04N 1/00816* (2013.01); *H04N 1/00519* (2013.01); *H04N 1/00525* (2013.01); *H04N 1/00551* (2013.01); *H04N 1/00559* (2013.01); *H04N 1/1013* (2013.01); *H04N 1/1039* (2013.01); *H04N 1/1065* (2013.01); *H04N 1/2323* (2013.01); *H04N 2201/0081* (2013.01); *H04N 2201/0096* (2013.01); *H04N 2201/045* (2013.01); *H04N 2201/0422* (2013.01); *H04N 2201/0456* (2013.01)

(58) Field of Classification Search
None
See application file for complete search history.

(56) References Cited

U.S. PATENT DOCUMENTS

| 2005/0052680 A1 | 3/2005 | Okamura |
| 2009/0040570 A1 | 2/2009 | Nakaishi et al. |

FOREIGN PATENT DOCUMENTS

| JP | S63-031268 A | 2/1988 |
| JP | H09-294187 A | 11/1997 |
| JP | 2004-357023 A | 12/2004 |
| JP | 2007-102048 A | 4/2007 |
| JP | 2009-182949 A | 8/2009 |
| JP | 2011-066854 A | 3/2011 |

OTHER PUBLICATIONS

Translation for JP 2011-066854.*
Search Report issued in corresponding International Patent Application No. PCT/JP2016/053394, dated Apr. 5, 2016.

* cited by examiner

*Primary Examiner* — Lennin R Rodriguezgonzalez
(74) *Attorney, Agent, or Firm* — McDermott Will & Emery LLP (57) ABSTRACT

An image reading apparatus includes a platen, a copyholder configured to rotate around a rotary axis, and a reader configured to read a reading surface pressed against the copyholder, of a document placed on the platen. The reader is supported by the copyholder to be able to move in a direction not parallel to the rotary axis.

5 Claims, 8 Drawing Sheets

IMAGE READING APPARATUS AND IMAGE READING METHOD FOR READING DOCUMENT WITH READER SUPPORTED BY COPYHOLDER

CROSS-REFERENCE TO RELATED APPLICATION

This application is a continuation of International Application No. PCT/JP2016/053394, filed on Feb. 4, 2016, the entire contents of which are incorporated herein by reference.

FIELD

The embodiments discussed herein are related to an image reading apparatus and an image reading method.

BACKGROUND

An image reading apparatus that reads a reading surface of a document includes, for example, a platen, a copyholder, and a reading unit. The copyholder includes a transparent flat plate through which light penetrates and is configured to be openable and closeable. When being closed, the copyholder presses a document placed on the platen by the transparent flat plate to hold the document so that the document does not move. The reading unit uses light penetrating the transparent flat plate from the reading surface of the document that is pressed by the transparent flat plate, to read the reading surface thereof (see, for example, Japanese Laid-open Patent Publication No. 63-31268 and Japanese Laid-open Patent Publication No. 09-294187).

According to such an image reading apparatus, a user needs to open or close the copyholder every time the user changes a document to be read or turns a page. Therefore, load increases when the user computerizes many books by using the image reading apparatus.

SUMMARY

According to an aspect of the embodiments, An image reading apparatus includes a platen, a copyholder configured to rotate around a rotary axis, and a reader configured to read a reading surface pressed against the copyholder, of a document placed on the platen. The reader is supported by the copyholder to be able to move in a direction not parallel to the rotary axis.

The object and advantages of the technique will be realized and attained by means of the elements and combinations particularly pointed out in the claims.

It is to be understood that both the foregoing general description and the following detailed description are exemplary and explanatory and are not restrictive of the technique, as claimed.

DESCRIPTION OF EMBODIMENTS

Preferred embodiments of the present invention will be explained with reference to accompanying drawings. Note that the present disclosure is not limited by this embodiment.

Embodiments of an image reading apparatus disclosed in the present application will be explained below in detail with reference to the accompanying drawings. The is not limited to the embodiments. In addition, in the following descriptions, identical constituent elements are denoted by like reference signs and redundant explanations thereof are omitted.

First Embodiment

Configuration of Image Reading Apparatus

Figure 1:
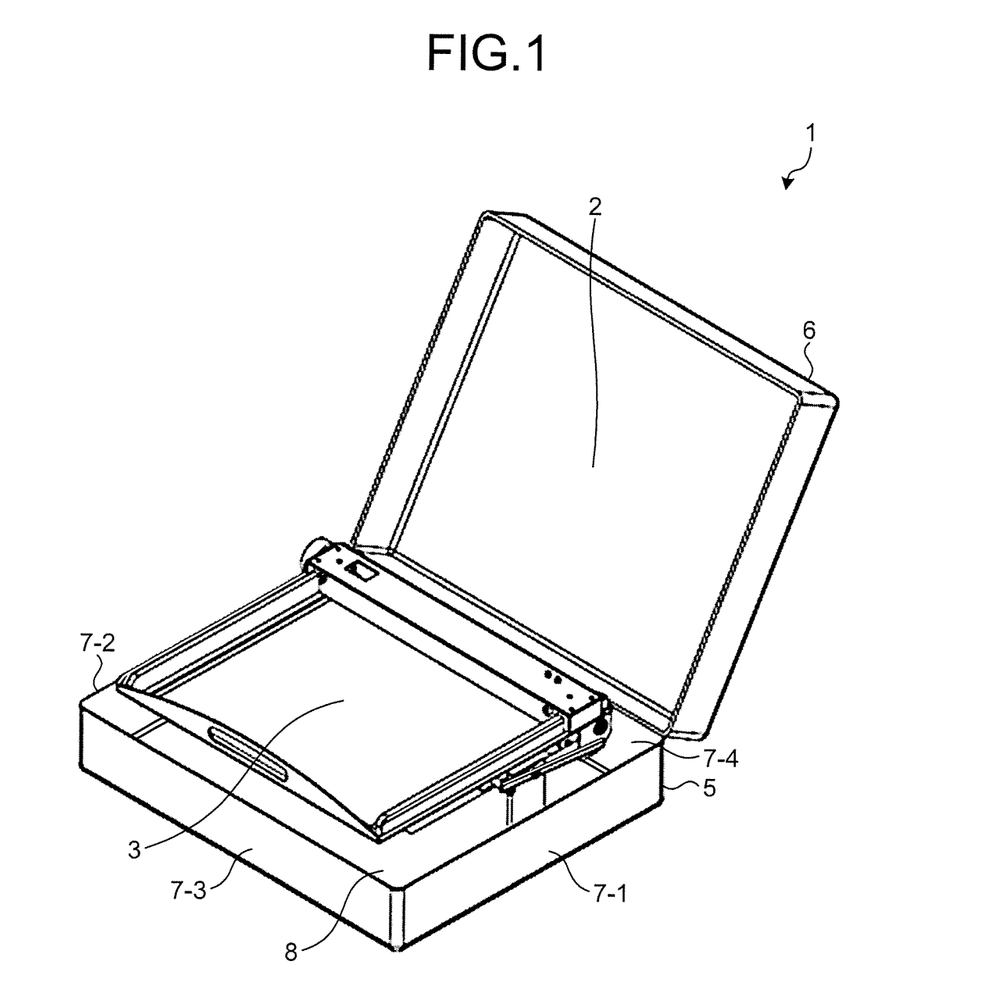
FIG. 1 is a perspective view depicting an image reading apparatus according to a first embodiment.

FIG. 1 is a perspective view depicting an image reading apparatus according to a first embodiment. As depicted in FIG. 1, an image reading apparatus 1 includes a case 2 together with an image reading apparatus body 3. The case 2 includes a case body 5 and a lid 6. The case body 5 includes a right-side side part 7-1, a left-side side part 7-2, a front-side side part 7-3, a rear-side side part 7-4, and a bottom 8.

The bottom 8 is formed in a flat plate shape. The right-side side part 7-1 is formed in an oblong plate shape and bonded to an edge of the bottom 8 so as to extend along a flat surface vertical to a flat surface along which the bottom 8 extends. The left-side side part 7-2 is formed in a plate shape substantially identical to that of the right-side side part 7-1, and bonded to an edge of the bottom 8 opposite to the edge to which the right-side side part 7-1 is bonded to face the right-side side part 7-1, that is, so as to extend along a flat surface parallel to the flat surface along which the right-side side part 7-1 extends. The front-side side part 7-3 is formed in an oblong plate shape and bonded to an edge of the right-side side part 7-1, an edge of the left-side side part 7-2, and an edge of the bottom 8 so as to be vertical to the right-side side part 7-1 and the left-side side part 7-2 and to extend along a flat surface vertical to the bottom 8. The rear-side side part 7-4 is formed in a plate shape substantially identical to that of the front-side side part 7-3. The rear-side side part 7-4 is arranged to face the front-side side part 7-3, that is, to extend along a parallel plane parallel to the front-side side part 7-3. The rear-side side part 7-4 is bonded to an edge of the right-side side part 7-1 opposite to the edge thereof to which the front-side side part 7-3 is bonded, to an edge of the left-side side part 7-2 opposite to the edge thereof to which the front-side side part 7-3 is bonded, and to an edge of the bottom 8 opposite to the edge to which the front-side side part 7-3 is bonded. Thus, the case body 5 is formed in a box shape with an opening by being formed of the right-side side part 7-1, the left-side side part 7-2, the front-side side part 7-3, the rear-side side part 7-4, and the bottom 8.

The lid 6 is formed in a box shape with an opening in the same manner as the case body 5, and the opening thereof is formed to match with the opening of the case body 5. The lid 6 is rotatably supported by an edge of the rear-side side part 7-4, opposite to the edge of the case body 5 to which the bottom 8 is bonded. The lid 6 is rotated to open and close the opening of the case body 5, and because the opening of the lid 6 matches with the opening of the case body 5, the interior of the case 2 is isolated from outside. The image reading apparatus body 3 is arranged inside the case 2.

Figure 2:
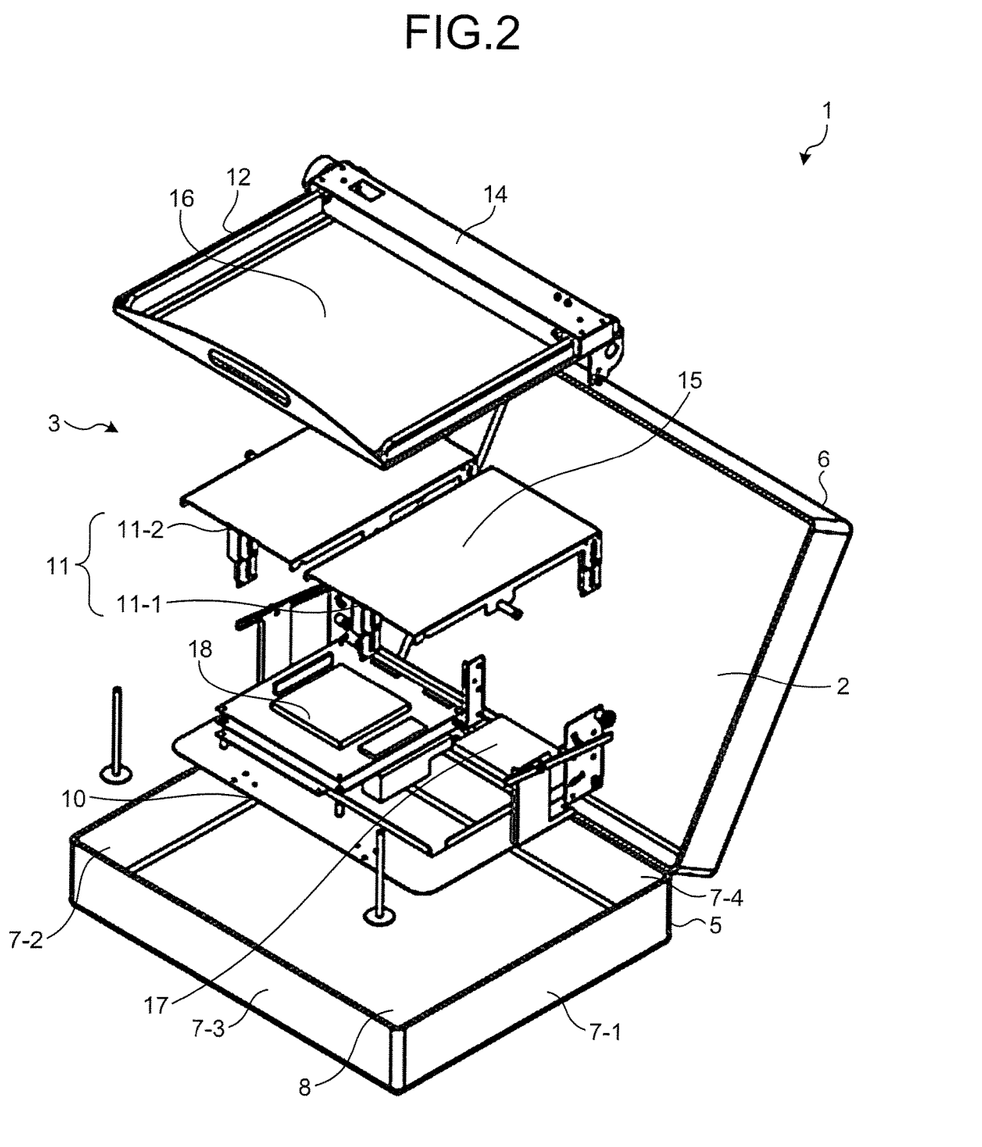
FIG. 2 is an exploded perspective view depicting the image reading apparatus according to the first embodiment.

FIG. 2 is an exploded perspective view depicting the image reading apparatus according to the first embodiment. The image reading apparatus body 3 includes, as depicted in FIG. 2, a base 10, a platen 11, a copyholder 12, and a reading unit 14. The base 10 is arranged inside the case 2 and fixed to the bottom 8 of the case 2.

The platen 11 is arranged so that the base 10 is arranged between the platen 11 and the bottom 8 of the case 2, that is, arranged above the base 10 when the bottom 8 of the case 2 is placed on a horizontal plane, and is supported by the base 10. The platen 11 includes a right-side platen 11-1 and a left-side platen 11-2. The right-side platen 11-1 is arranged on the side near the right-side side part 7-1. The left-side platen 11-2 is arranged between the right-side platen 11-1 and the left-side side part 7-2, that is, arranged on the side near the left-side side part 7-2. A flat placing surface 15 is formed on the right-side platen 11-1.

The copyholder 12 is arranged above the platen 11 so that the platen 11 is arranged between the base 10 and the copyholder 12 and is supported by the base 10. The copyholder 12 includes a transparent flat plate 16. The transparent flat plate 16 is formed of a material that transmits light exemplified by visible light and is formed in an oblong plate shape. The reading unit 14 is formed in an elongated cuboid shape. The reading unit 14 is arranged above the copyholder 12 so that the copyholder 12 is arranged between the reading unit 14 and the platen 11.

The image reading apparatus body 3 further includes a power supply unit 17 and a controller 18. The power supply unit 17 and the controller 18 are respectively arranged between the base 10 and the platen 11 and fixed to the base 10.

Configuration of Platen

Figure 3:
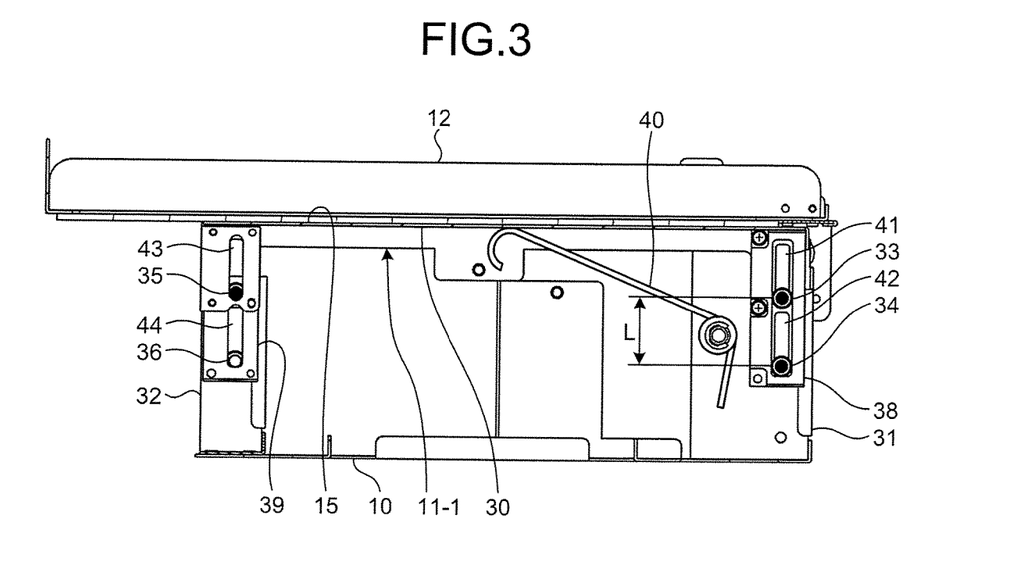
FIG. 3 is a side view depicting a platen according to the first embodiment.

FIG. 3 is a side view depicting the platen according to the first embodiment. As depicted in FIG. 3, the right-side platen 11-1 includes a platen body 30, a base-side rear-side support member 31, and a base-side front-side support member 32. The platen body 30 is formed in an oblong plate shape and the flat placing surface 15 is formed thereon. The platen body 30 is arranged above the base 10 so that the base 10 is arranged between the platen body 30 and the bottom 8 of the case 2. The platen body 30 is arranged so that the placing surface 15 extends along a flat surface parallel to a horizontal surface where the bottom 8 of the case 2 is placed, and the placing surface 15 faces the side opposite to the base 10.

The base-side rear-side support member 31 is arranged to project upward from the base 10 and is fixed to the base 10. A rear-side upside sliding roller 33 and a rear-side downside sliding roller 34 are formed in the base-side rear-side support member 31. The rear-side upside sliding roller 33 is formed of, for example, a bearing. The rear-side upside sliding roller 33 is rotatably supported by a shaft projecting from a surface of the base-side rear-side support member 31 facing the right-side side part 7-1 of the case 2 toward the right-side side part 7-1. The rear-side downside sliding roller 34 is formed of, for example, a bearing. The rear-side downside sliding roller 34 is arranged on the lower side of the rear-side upside sliding roller 33 by a predetermined distance L and is rotatably supported by a shaft projecting from a surface of the base-side rear-side support member 31 facing the right-side side part 7-1 of the case 2 toward the right-side side part 7-1 of the case 2.

The base-side front-side support member 32 is arranged on the side closer to the front-side side part 7-3 of the case 2 than the base-side rear-side support member 31 to project upward from the base 10 and is fixed to the base 10. A front-side upside sliding roller 35 and a front-side downside sliding roller 36 are formed in the base-side front-side support member 32. The front-side upside sliding roller 35 is formed of, for example, a bearing. The front-side upside sliding roller 35 is rotatably supported by a shaft projecting from a surface of the base-side front-side support member 32 facing the right-side side part 7-1 of the case 2 toward the right-side side part 7-1. The front-side downside sliding roller 36 is formed of, for example, a bearing. The front-side downside sliding roller 36 is arranged on the lower side of the front-side upside sliding roller 35 by the predetermined distance L and is rotatably supported by a shaft projecting from a surface of the base-side front-side support member 32 facing the right-side side part 7-1 of the case 2 toward the right-side side part 7-1.

The right-side platen 11-1 further includes a platen-side rear-side support member 38, a platen-side front-side support member 39, and a torsion coil spring 40. The platen-side rear-side support member 38 is formed in a plate shape. The platen-side rear-side support member 38 is arranged to project downward from the platen body 30 along a flat surface parallel to the right-side side part 7-1 of the case 2 and fixed to the platen body 30. A rear-side upside slide groove 41 and a rear-side downside slide groove 42 are formed in the platen-side rear-side support member 38. The rear-side upside slide groove 41 is formed to extend along a straight line vertical to the placing surface 15. The rear-side upside slide groove 41 is fitted with the rear-side upside sliding roller 33 and guides the rear-side upside sliding roller 33 to perform parallel movement in a direction vertical to the placing surface 15. The rear-side downside slide groove 42 is arranged on a side closer to the base 10 than the rear-side upside slide groove 41 and is formed to extend along a straight line vertical to the placing surface 15. The rear-side downside slide groove 42 is fitted with the rear-side downside sliding roller 34 and guides the rear-side downside sliding roller 34 to perform parallel movement in the direction vertical to the placing surface 15.

The platen-side front-side support member 39 is formed in a plate shape. The platen-side front-side support member 39 is arranged on the side closer to the front-side side part 7-3 of the case 2 than the platen-side rear-side support member 38 to project downward from the platen body 30 along the flat surface parallel to the right-side side part 7-1 of the case 2 and is fixed to the platen body 30. A front-side upside slide groove 43 and a front-side downside slide groove 44 are formed in the platen-side front-side support member 39. The front-side upside slide groove 43 is formed to extend along a straight line vertical to the placing surface 15. The front-side upside slide groove 43 is fitted with the front-side upside sliding roller 35 and guides the front-side upside sliding roller 35 to perform parallel movement in the direction vertical to the placing surface 15. The front-side downside slide groove 44 is arranged on the side closer to the base 10 than the front-side upside slide groove 43 and is formed to extend along a straight line parallel to a vertical direction. The front-side downside slide groove 44 is formed to extend along a straight line vertical to the placing surface 15. The front-side downside slide groove 44 is fitted with the front-side downside sliding roller 36 and guides the front-side downside sliding roller 36 to perform parallel movement in the direction vertical to the placing surface 15.

The torsion coil spring 40 is formed of an elastic body and is formed in a bent bar shape. The torsion coil spring 40 is fixed to the base-side rear-side support member 31 at one end, and the other end abuts on the surface of the platen body 30 on the side of the base 10. The torsion coil spring 40 applies an elastic force to the platen body 30 so that the platen body 30 moves away from the base 10, that is, the platen body 30 is pushed upward.

Therefore, in the right-side platen 11-1, the platen body 30 is supported by the base 10 so that the placing surface 15 performs parallel movement in the vertical direction. In the right-side platen 11-1, because the rear-side upside sliding roller 33 and the rear-side downside sliding roller 34 are away from each other by the distance L, when the placing surface 15 moves in the vertical direction, inclination of the placing surface 15 is prevented. In the right-side platen 11-1, because the torsion coil spring 40 is provided, when a downward force is not applied to the platen body 30, the platen body 30 is supported by the base 10 so that the placing surface 15 is arranged at a predetermined upper end position. In the right-side platen 11-1, when a downward force is applied to the platen body 30, the placing surface 15 moves downward by a distance corresponding to the force. The rear-side upside sliding roller 33, the rear-side downside sliding roller 34, the front-side upside sliding roller 35, and the front-side downside sliding roller 36 can be formed of a member other than the bearing and can be replaced, for example, by a resin roller made of resin. In this case also, the right-side platen 11-1 can similarly prevent inclination of the placing surface 15, when the platen body 30 moves in the vertical direction.

The left-side platen 11-2 is formed in the same manner as the right-side platen 11-1, so that the left-side platen 11-2 is plane-symmetrical to the right-side platen 11-1 with respect to a symmetric face being parallel to the right-side side part 7-1 and the left-side side part 7-2. That is, in the left-side platen 11-2, the platen body is supported by the base 10 to perform parallel movement in the vertical direction. In the left-side platen 11-2, further, when a downward force is not applied to the platen body of the left-side platen 11-2, the left-side platen 11-2 is formed so that the placing surface thereof extends along the flat surface along the placing surface 15 of the right-side platen 11-1, in which the downward force is not applied to the platen body 30.

Configuration of Copyholder

Figure 4:
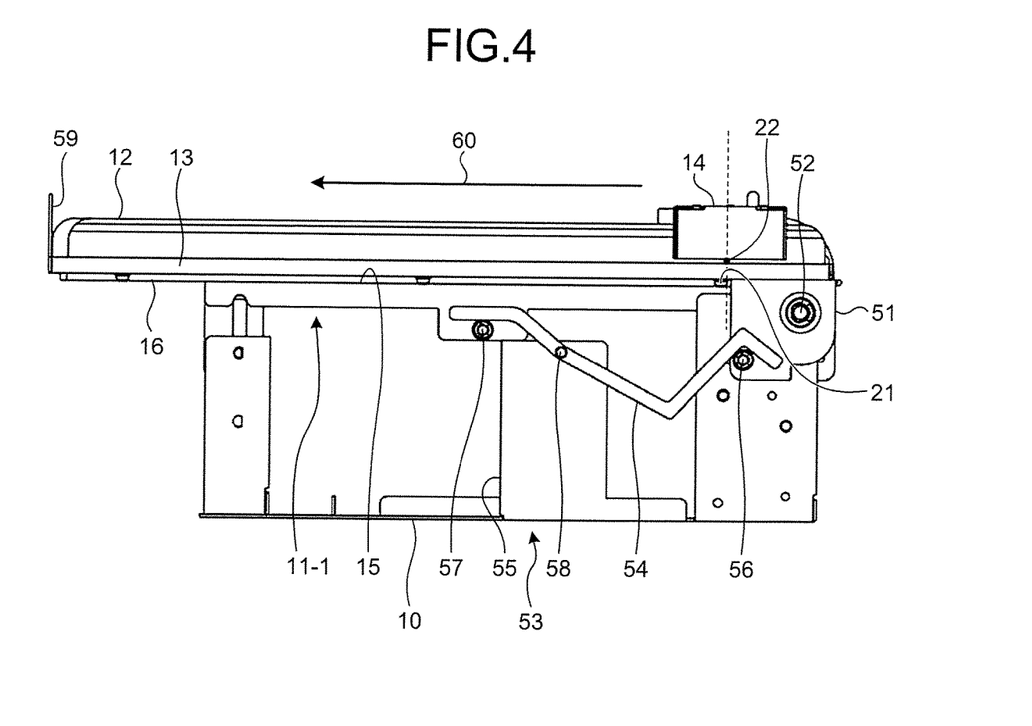
FIG. 4 is a side view depicting a copyholder, a reading unit, and an interlocking mechanism according to the first embodiment.

FIG. 4 is a side view depicting the copyholder, the reading unit, and the interlocking mechanism according to the first embodiment. The copyholder 12 includes, as depicted in FIG. 4, a frame 13, a transparent flat plate 16, a support member 51, and a handle 59. The transparent flat plate 16 is formed of a material that transmits light exemplified by visible light and is formed in an oblong plate shape. The frame 13 surrounds the periphery of the transparent flat plate 16 and is fixed to the transparent flat plate 16 by a double-sided tape or by mechanical restraint. The support member 51 is arranged at the edge of the frame 13 and is fixed to the frame 13. The support member 51 is supported by the base 10 rotatably around a rotary axis 52. The copyholder 12 is supported by the base 10 rotatably around the rotary axis 52, because the support member 51 is rotatably supported by the base 10. The rotary axis 52 is parallel to the placing surface 15, and parallel to a flat surface along which the rear-side side part 7-4 of the case 2 extends, that is, parallel to a direction in which the left-side platen 11-2 and the right-side platen 11-1 are aligned. The handle 59 is formed in a plate shape with a hole formed therein. The handle 59 is arranged at the edge of the frame 13 on the side opposite to the edge where the support member 51 is arranged and is fixed to the frame 13.

The reading unit 14 is arranged above the copyholder 12 so that a longitudinal direction of the reading unit 14 becomes parallel to the rotary axis 52 and the copyholder 12 is arranged between the reading unit 14 and the platen 11. The copyholder 12 supports the reading unit 14 to be able to perform parallel movement in parallel to a sub-scanning direction 60. The sub-scanning direction 60 is parallel to the transparent flat plate 16 and vertical to the rotary axis 52 of the copyholder 12. When the reading unit 14 is arranged at a home position 22, the copyholder 12 restricts movement of the reading unit 14 so as not to move away from the handle 59. The home position 22 is generally located above an end 21 of the platen 11 on the side of the rotary axis 52.

Configuration of Interlocking Mechanism

The image reading apparatus body 3 also includes an interlocking mechanism 53, as depicted in FIG. 4. The interlocking mechanism 53 includes a link 54, a fulcrum base 55, a point of effort 56, and a point of load 57. The link 54 is formed of a bent bar. The fulcrum base 55 is fixed on the base 10. The fulcrum base 55 supports the link 54 rotatably around a rotary axis 58. The rotary axis 58 is arranged to be parallel to the rotary axis 52, and below the platen body 30 so that the rotary axis 58 is arranged at all times below a flat surface along which the placing surface 15 of the platen body 30 extends. The point of effort 56 is formed in a projection projecting from a part of the support member 51 of the copyholder 12 toward the right-side side part 7-1. The point of effort 56 pushes one end of the link 54 upward when the copyholder 12 rotates around the rotary axis 52 so that the transparent flat plate 16 moves away from the placing surface 15 of the platen 11. The point of load 57 is formed in a projection projecting from a surface of a member facing the right-side side part 7-1, which projects from a lower part of the platen body 30 of the platen 11, toward the right-side side part 7-1. When the copyholder 12 rotates around the rotary axis 52, the link 54 rotates around the rotary axis 58 to press the point of load 57 downward by one end opposite to the other end that is pushed upward by the point of effort 56 of the link 54.

Therefore, the interlocking mechanism 53 presses the placing surface 15 of the right-side platen 11-1 downward, when the copyholder 12 rotates around the rotary axis 52 so that the transparent flat plate 16 moves away from the placing surface 15.

Figure 5:
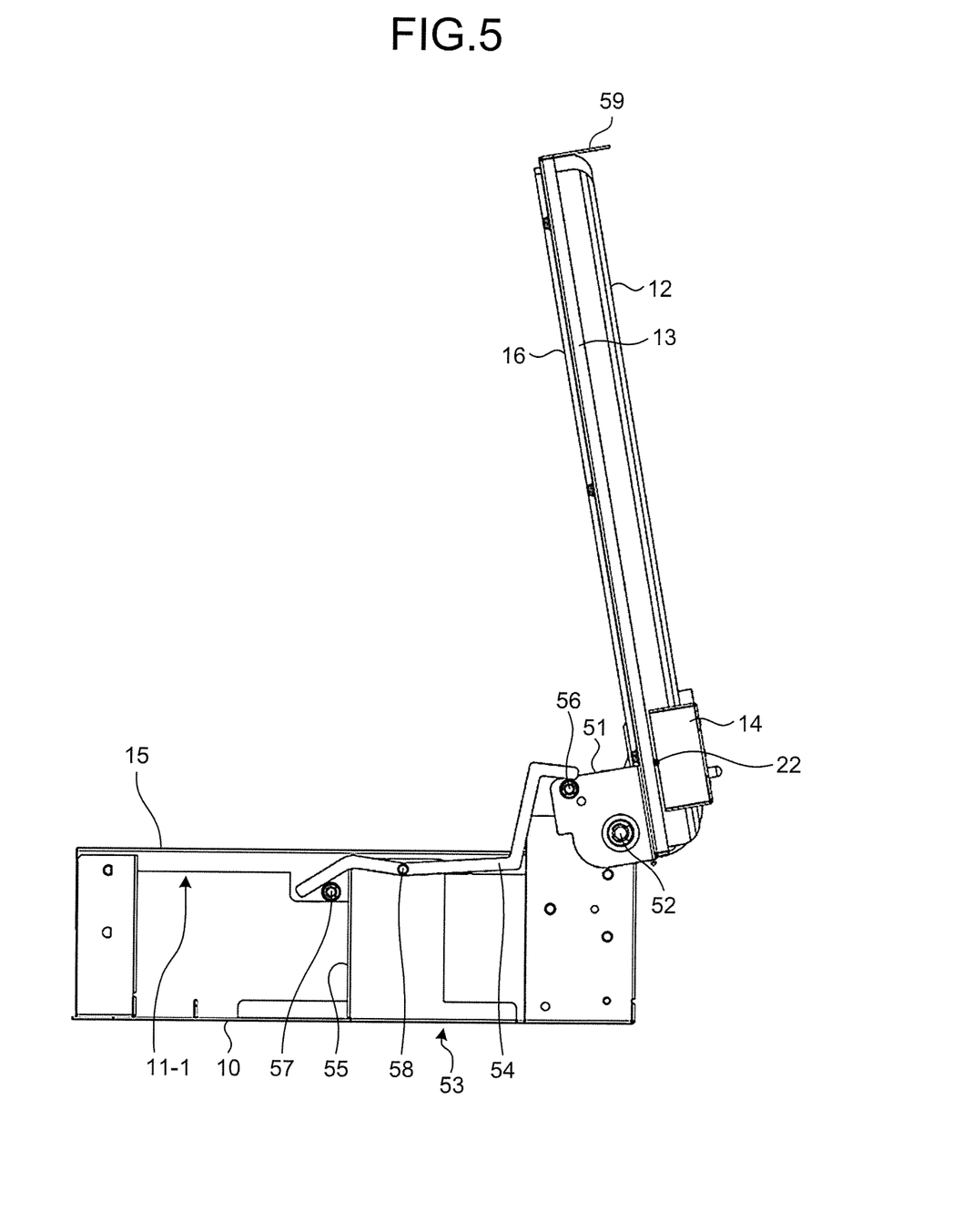
FIG. 5 is a side view depicting the platen and the interlocking mechanism when the copyholder according to the first embodiment is opened.

FIG. 5 is a side view depicting the platen and the interlocking mechanism when the copyholder according to the first embodiment is opened. More specifically, FIG. 5 depicts a state in which the copyholder 12 is opened by rotating around the rotary axis 52 so that the transparent flat plate 16 moves away from the placing surface 15 of the right-side platen 11-1. At this time, the interlocking mechanism 53 lowers the platen body 30 so that the placing surface 15 of the right-side platen 11-1 is arranged at a position lower than the height at which the placing surface 15 of the right-side platen 11-1 has been arranged in a state in which the copyholder 12 is closed (see FIG. 4).

The link 54 of the interlocking mechanism 53 is arranged in such a manner that the point of load 57 and the rotary axis 58 are arranged on the lower side than the position where the placing surface 15 is arranged, in a state in which the copyholder 12 is closed. Therefore, the link 54 of the interlocking mechanism 53 can be formed so as not be arranged at a position higher than a surface extended from the placing surface 15 in an axial direction of the rotary axis 52 at all times, when the copyholder 12 is opened or closed. The interlocking mechanism 53 is prevented from interfering with a document placed on the right-side platen 11-1, because the interlocking mechanism 53 is not arranged at the position higher than the surface extended from the placing surface 15 in the direction of the rotary axis 52.

By forming the interlocking mechanism 53 in this manner, when the copyholder 12 is closed, the transparent flat plate 16 can approach the platen 11 with an angle nearly parallel to the placing surface of the platen 11. In the image reading apparatus 1, because the transparent flat plate 16 approaches the platen 11 with the angle nearly parallel to the placing surface of the platen 11, the transparent flat plate 16 of the copyholder 12 can come into contact with the reading surface of a document placed on the platen 11 with the angle nearly parallel thereto. Therefore, the image reading apparatus 1 can prevent that a document crinkles when the transparent flat plate 16 of the copyholder 12 is pressed against the document.

The interlocking mechanism 53 mechanically converts rotary motion to rotate the copyholder 12 to up and down motion to move the platen body 30 of the platen 11 up and down, thereby lifting the platen body 30 without using power, which is power saving. The interlocking mechanism 53 can reduce load of the power supply unit 17 as compared with other interlocking mechanisms that move the platen body 30 up and down by electrical power. Therefore, the image reading apparatus 1 including the interlocking mechanism 53 can read more documents with one charge of the power supply unit 17.

The image reading apparatus body 3 also includes another interlocking mechanism (not depicted). The interlocking mechanism is formed in the same manner as the interlocking mechanism 53, and when the copyholder 12 is opened, moves the placing surface of the left-side platen 11-2 downward. The interlocking mechanism is formed not to be arranged above a surface extended from the placing surface of the left-side platen 11-2 in the direction of the rotary axis 52, when the copyholder 12 is closed, and not to interfere with a document placed on the left-side platen 11-2.

Configuration of Image Reading Apparatus

Figure 6:
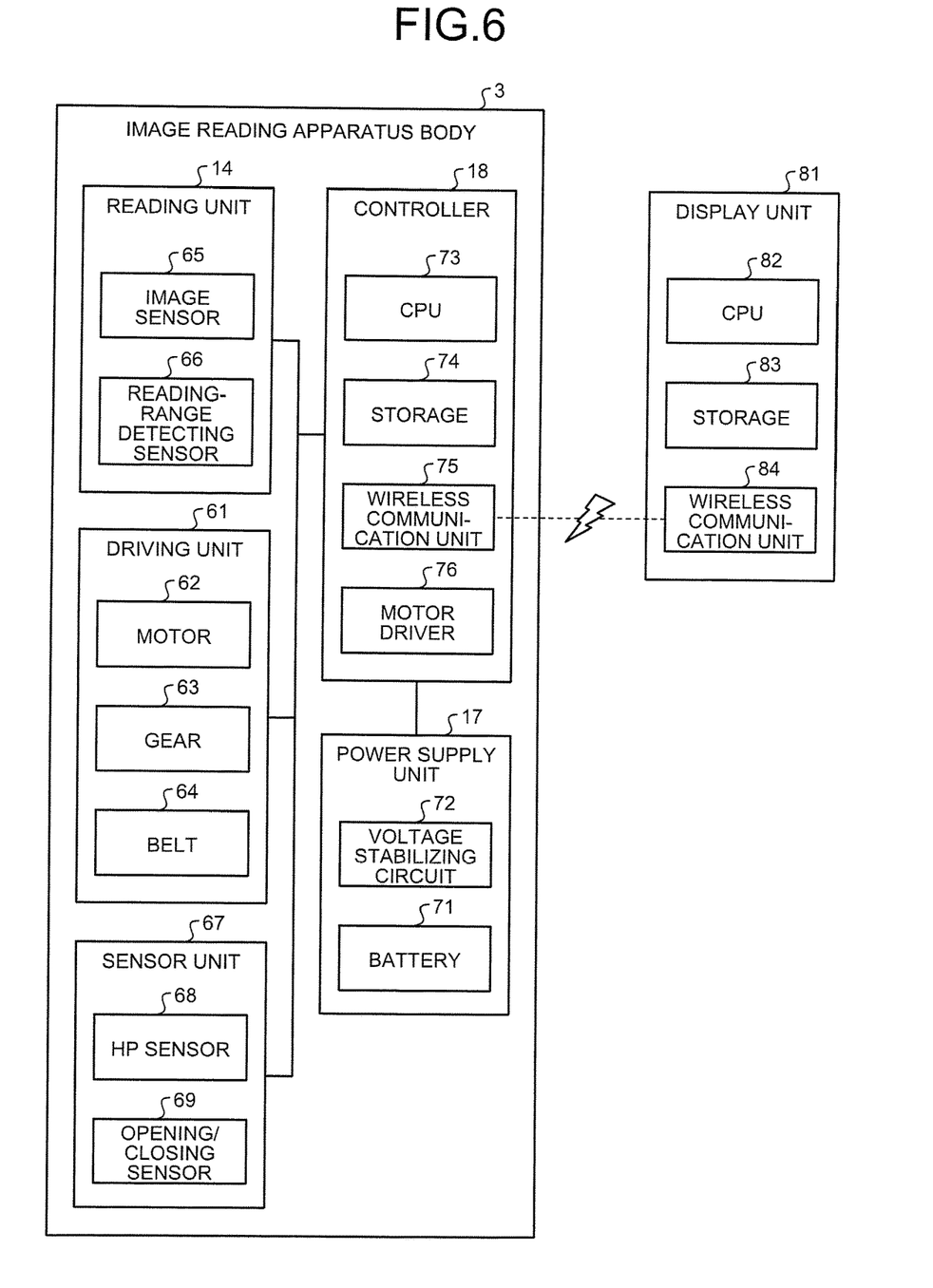
FIG. 6 is a block diagram depicting the image reading apparatus according to the first embodiment.

FIG. 6 is a block diagram depicting the image reading apparatus according to the first embodiment. The image reading apparatus 1 includes, as depicted in FIG. 6, the reading unit 14, the power supply unit 17, the controller 18, a driving unit 61, a sensor unit 67, and a display unit 81. The driving unit 61 includes a motor 62, gears 63, and a belt 64. The motor 62 is controlled by the controller 18 to rotate the gears 63 by using electric power supplied from outside. The belt 64 is formed in a belt shape, one part thereof surrounds the gears 63, and the other part is bonded to the reading unit 14. The gears 63 are rotated by the motor 62 to move the belt 64, thereby moving the reading unit 14 in parallel to the sub-scanning direction 60. That is, the driving unit 61 is controlled by the controller 18 to move the reading unit 14 in parallel to the sub-scanning direction 60.

The reading unit 14 includes an image sensor 65 and a reading-range detecting sensor 66. The image sensor 65 is formed of a contact image sensor (CIS)-type image sensor. The image sensor 65 is formed in a linear shape and is arranged on a surface of the reading unit 14 facing the transparent flat plate 16 so as to extend along a straight line parallel to a main scanning direction vertical to the sub-scanning direction 60. The image sensor 65 is controlled by the controller 18 to irradiate light to a linear reading line parallel to the main scanning direction on the reading surface to be read, against which the transparent flat plate 16 is being pressed, via the transparent flat plate 16. The image sensor 65 receives light reflected by the reading line via the transparent flat plate 16. The image sensor 65 also detects the received light and outputs image information indicating a detection result to the controller 18.

The reading-range detecting sensor 66 is installed in the reading unit 14 and is formed of, for example, a two-dimensional sensor that reads a two-dimensional image on a reading surface of a document. The reading-range detecting sensor 66 is controlled by the controller 18 when the reading unit 14 is moving, to monitor a document placed on the platen 11 or the platen 11 and detect a position at the edge of the document. By detecting the position of the edge of the document placed on the platen 11, the reading-range detecting sensor 66 detects a timing at which the image sensor 65 stops reading the document placed on the platen 11.

The sensor unit 67 includes a home position (HP) sensor 68 and an opening/closing sensor 69. The HP sensor 68 is controlled by the controller 18 to detect whether the reading unit 14 is arranged at the home position 22. The opening/closing sensor 69 is controlled by the controller 18 to measure an opening degree of the copyholder 12.

The power supply unit 17 includes a battery 71 and a voltage stabilizing circuit 72. The battery 71 is connected to the voltage stabilizing circuit 72 and supplies direct-current power to the voltage stabilizing circuit 72. The voltage stabilizing circuit 72 is connected to the controller 18, to stabilize power supplied from the battery 71 to have a voltage of a certain value and to supply the stabilized power to the controller 18.

The controller 18 is a so-called "computer" and includes a central processing unit (CPU) 73, a storage 74, a wireless communication unit 75, and a motor driver 76. The CPU 73 executes a computer program installed in the controller 18 to control the storage 74, the wireless communication unit 75, and the motor driver 76, and also controls the reading unit 14 and the driving unit 61. The storage 74 records the computer program and temporarily records information created by the CPU 73. The wireless communication unit 75 is controlled by the CPU 73 to output information received from an external device via wireless communication and to output the information created by the CPU 73 to tan external device via wireless communication. The motor driver 76 is controlled by the CPU 73 to supply predetermined power of the power supplied from the power supply unit 17 to the motor 62 of the driving unit 61, thereby moving the reading unit 14 at a predetermined speed by a predetermined distance.

The controller 18 controls the HP sensor 68 to detect whether the reading unit 14 is arranged at the home position 22 when the image reading apparatus 1 is activated or reading by the reading unit 14 is complete. If the reading unit 14 is not arranged at the home position 22, the controller 18 controls the driving unit 61 to move the reading unit 14 toward the home position 22. The controller 18 controls the opening/closing sensor 69 to detect the opening degree of the copyholder 12 when the reading unit 14 is arranged at the home position 22. The controller 18 controls the driving unit 61 so that the reading unit 14 moves from the home position 22 toward the handle 59 in parallel to the sub-scanning direction 60 at a predetermined speed, when the copyholder 12 is closed. When the reading unit 14 is moving at the predetermined speed, the controller 18 controls the image sensor 65 to read a plurality of reading lines filled on the reading surface, against which the transparent flat plate 16 is being pressed, of a document placed on the platen 11. The controller 18 creates a two-dimensional image copying the reading surface based on a plurality of pieces of image information respectively indicating the reading lines read by the image sensor 65 and transmits the created image to the display unit 81.

The display unit 81 is a so-called "computer", includes a CPU 82, a storage 83, and a wireless communication unit 84, and also includes an input/output device (not depicted). The CPU 82 executes a computer program installed in the controller 18 to control the storage 83 and the wireless communication unit 84. As the display unit 81, a tablet personal computer (PC), a tablet terminal, and a smartphone are exemplified.

The display unit 81 receives an image transmitted from the image reading apparatus 1 via wireless communication, records the received image in the storage 83, and displays the received image on the input/output device.

Image Reading Method

Figure 7:
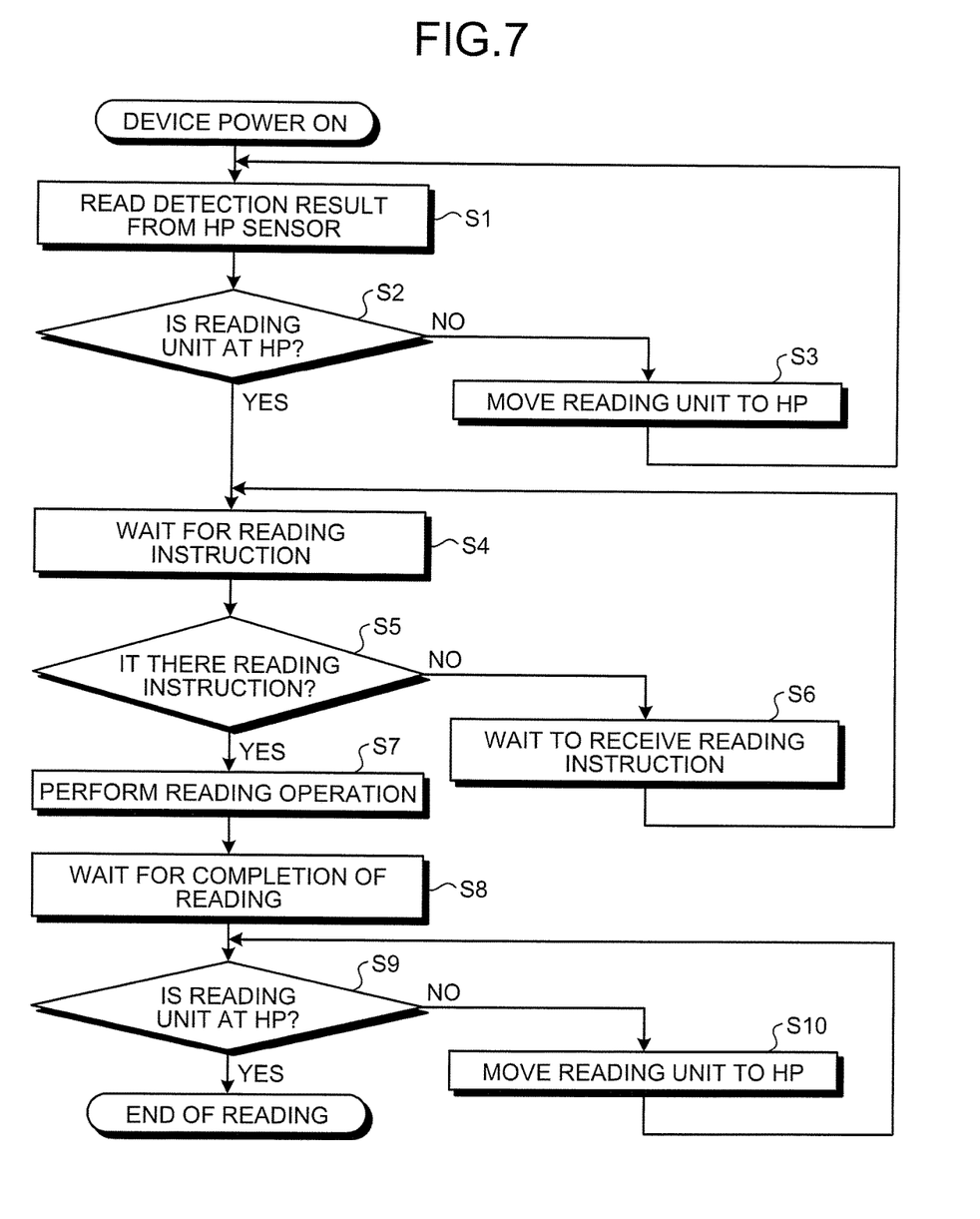
FIG. 7 is a flowchart depicting an image reading method.

FIG. 7 is a flowchart depicting an image reading method. The image reading method is executed by the image reading apparatus 1. A user first carries the image reading apparatus 1 in a state in which the image reading apparatus body 3 is stored in the case 2 to a workplace where a workbench is installed. After carrying the image reading apparatus 1 to the workplace, the user places the image reading apparatus 1 on the workbench, with the bottom 8 of the case 2 facing downward. After placing the image reading apparatus 1 on the workbench, the user opens the lid 6 of the case 2 to expose the image reading apparatus body 3, and switches on the image reading apparatus 1 by operating the image reading apparatus body 3. When the image reading apparatus 1 is switched on and activated by an operation of the user, the controller 18 controls the HP sensor 68 to determine whether the reading unit 14 is arranged at the home position 22 and reads a detection result from the HP sensor 68 (Step S1).

If the reading unit 14 is not arranged at the home position 22 (NO at Step S2), the controller 18 controls the driving unit 61 to move the reading unit 14 toward the home position 22 (Step S3). The controller 18 repeatedly performs the processes from Step S1 to Step S3, until the controller 18 determines that the reading unit 14 is arranged at the home position 22. When determining that the reading unit 14 is arranged at the home position 22 (YES at Step S2), the controller 18 transits to a mode for waiting for a reading instruction (Step S4).

After the reading unit 14 is arranged at the home position 22, the user places a hand on the handle 59 of the copyholder 12 to lift the handle 59. Because the handle 59 is lifted, the copyholder 12 rotates and is opened so that the transparent flat plate 16 moves away from the placing surface 15 of the platen 11. After having opened the copyholder 12, the user places a prepared document on the platen 11 so that a desired reading surface faces up. For example, when placing a double-page book on the platen 11, the user places the right page of the book on the right-side platen 11-1, and the left page thereof on the left-side platen 11-2. After appropriately placing the document on the placing surface 15 of the platen 11, the user puts a finger in the hole of the handle 59 of the copyholder 12 to lower the handle 59. Because the handle 59 is lowered, the copyholder 12 rotates so that the reading surface of the document is pressed against the transparent flat plate 16 of the copyholder 12, and is closed.

In the right-side platen 11-1, when the copyholder 12 is closed, the torsion coil spring 40 is plastically deformed, and the platen body 30 is lowered by a distance corresponding to the thickness of the document placed on the right-side platen 11-1. The right-side platen 11-1 presses the reading surface of the document against the transparent flat plate 16 of the copyholder 12 by the elastic force of the torsion coil spring 40 of the right-side platen 11-1 and causes the reading surface of the document to be tightly pressed to the transparent flat plate 16 of the copyholder 12 appropriately. The right-side platen 11-1 further holds the document by sandwiching the document placed on the right-side platen 11-1 between the right-side platen 11-1 and the copyholder 12 by the elastic force of the torsion coil spring 40 of the right-side platen 11-1. The left-side platen 11-2 operates similarly to the right-side platen 11-1 when the copyholder 12 is closed.

By operating in this manner, even if the thickness of the right pages of the document is different from the thickness of the left pages, the platen 11 can cause both a reading surface of the right page and a reading surface of the left page to be tightly pressed to the transparent flat plate 16 of the copyholder 12 appropriately. When the copyholder 12 is closed, the document placed on the platen 11 is sandwiched between the platen 11 and the copyholder 12 with a predetermined force and is held appropriately, thereby preventing the document from moving.

After transiting to the mode for waiting for a reading instruction, the controller 18 controls the opening/closing sensor 69 to measure the opening degree of the copyholder 12. When the copyholder 12 is not closed (NO at Step S5), the controller 18 determines that there is no instruction, waits for a predetermined time (Step S6), and measures the opening degree of the copyholder 12 again. That is, after transiting to the mode for waiting for a reading instruction, the controller 18 controls the opening/closing sensor 69 to measure the opening degree of the copyholder 12 intermittently.

The controller 18 determines that there is a reading instruction from a user when the copyholder 12 is changed from an opened state to a closed state. That is, the controller 18 determines that there is a reading instruction when the copyholder 12 is closed (YES at Step S5), performs a reading operation (Step S7), and transits to a mode for waiting for completion of reading (Step S8). That is, the controller 18 controls the driving unit 61 to move the reading unit 14 in parallel to the sub-scanning direction 60 toward the handle 59 at a predetermined speed. The controller 18 controls the image sensor 65 of the reading unit 14 while the reading unit 14 is moving at a predetermined speed, to read each of the reading lines tightly filled on the reading surface.

The controller 18 also controls the reading-range detecting sensor 66 while the reading unit 14 is moving at a predetermined speed, to detect a timing at which the image sensor 65 passes above an edge of the document placed on the platen 11 on the side of the handle 59. Upon detection of the timing, the controller 18 controls the driving unit 61 to stop the movement of the reading unit 14 at the timing. If the position of the edge of the document placed on the platen 11 on the side of the handle 59 has not been detected, the controller 18 controls the driving unit 61 to stop the reading unit 14 at a position at the end of the copyholder 12 on the side of the handle 59. The controller 18 stops the movement of the reading unit 14 and stops reading of the reading lines by controlling the image sensor 65. The controller 18 creates an image copying the reading surface including the read reading lines based on the pieces of image information corresponding to the read reading lines. The controller 18 transmits the image to the display unit 81 via wireless communication. Upon reception of the image via wireless communication, the display unit 81 records the image in the storage 83 and displays the image on the input/output device.

Upon completion of the reading operation, the controller 18 controls the HP sensor 68 to determine whether the reading unit 14 is arranged at the home position 22 (Step S9). If the reading unit 14 is not arranged at the home position 22 (NO at Step S9), the controller 18 controls the driving unit 61 to move the reading unit 14 toward the home position 22 (Step S10). The controller 18 moves the reading unit 14 toward the home position 22, until the HP sensor 68 detects that the reading unit 14 is arranged at the home position 22.

When determining that the reading unit 14 is arranged at the home position 22 (YES at Step S9), the controller 18 stops the reading operation once and transits to the mode for waiting for a reading instruction again at Step S4.

Figure 8:
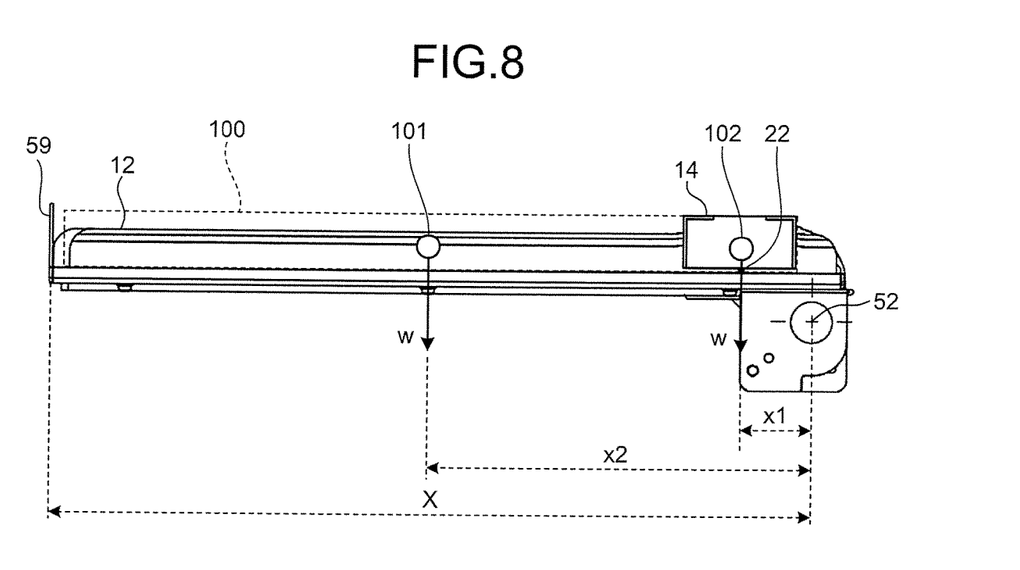
FIG. 8 is a side view depicting the reading unit according to the first embodiment and a reading unit according to a comparative example.

FIG. 8 is a side view depicting the reading unit according to the first embodiment and a reading unit according to a comparative example. Because the reading unit 14 is supported by the copyholder 12, when a user opens the copyholder 12, the reading unit 14 counteracts an operating force of pushing up the handle 59 by the user. The counteracting force of the reading unit 14 against the operating force when the reading unit 14 is arranged at the home position 22 is represented by the following expression:

$$w \cdot x1/X.$$

As depicted in FIG. 8, a weight w denotes the weight of the reading unit 14, a distance X denotes a distance from the rotary axis 52 to the handle 59, and a distance x1 denotes a distance from the rotary axis 52 to a center of gravity 102 of the reading unit 14.

A reading unit 100 of the comparative example is formed in an elongated cuboid shape similarly to the reading unit 14 and the weight thereof is the same as the weight w of the reading unit 14. However, as depicted in FIG. 8, the reading unit 100 is arranged above the copyholder 12 so that a longitudinal direction of the reading unit 100 is vertical to the rotary axis 52. The reading unit 100 is supported by the copyholder 12 so as to be able to perform parallel movement in parallel to the rotary axis 52. The reading unit 100 reads a reading surface of a document pressed by the copyholder 12, while moving in parallel to the axial direction of the rotary axis 52.

At this time, because the reading unit 100 is supported by the copyholder 12 so as to be able to perform parallel movement in parallel to the rotary axis 52, a distance x2 from the rotary axis 52 to a center of gravity 101 of the reading unit 100 is constant. A counteracting force of the reading unit 100 against the operating force of pushing up the handle 59 when a user opens the copyholder 12 is represented by the following expression:

$$w \cdot x2/X.$$

In the image reading apparatus 1, the operating force to open the copyholder 12 is reduced by a force represented by the following expression:

$$w \cdot (x2-x1)/X,$$

as compared with the imaging reading apparatus including the reading unit 109 of the comparative example. For example, when the weight w is 500 grams, the distance X is 300 millimeters, the distance x1 is 30 millimeters, and the distance x2 is 150 millimeters, the operating force of the image reading apparatus 1 is reduced by 200 grams as compared with the imaging reading apparatus of the comparative example.

Region in which Reading Unit Moves

Figure 9:
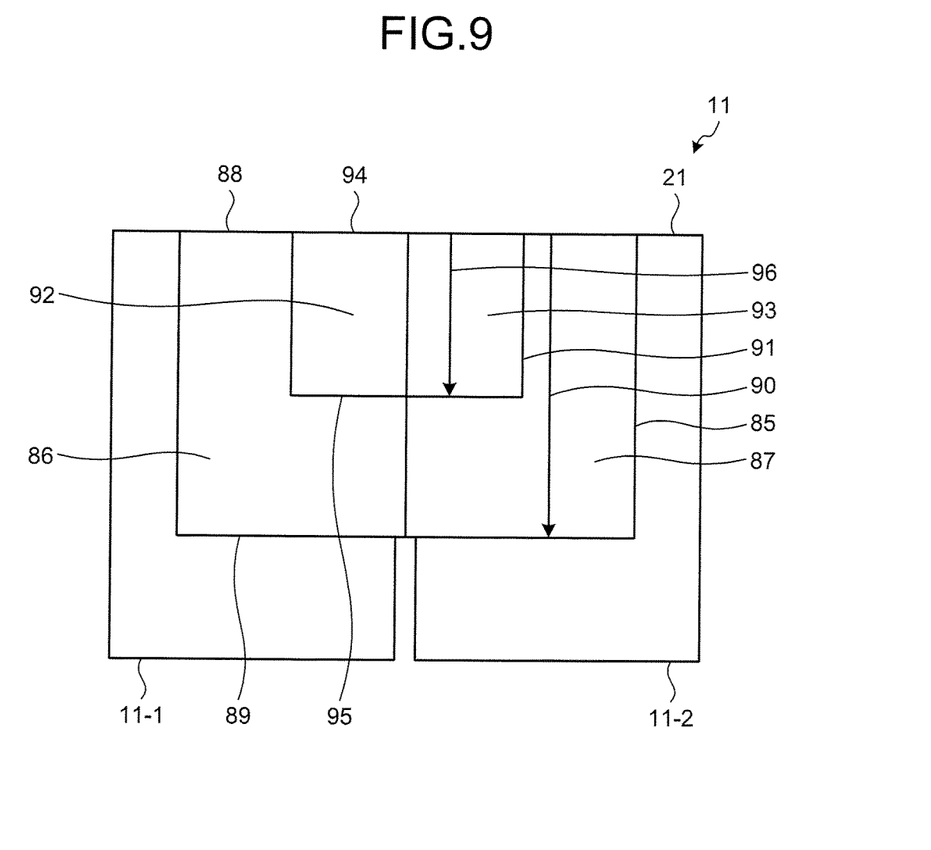
FIG. 9 is a plan view depicting a region in which the reading unit according to the first embodiment moves.

FIG. 9 is a plan view depicting a region in which the reading unit according to the first embodiment moves. When the image reading apparatus 1 reads a book 85, as depicted in FIG. 9, a predetermined page of the book 85 is opened and facing pages are read by the image reading apparatus 1. That is, the book 85 is placed on the platen 11 in such a manner that a facing right page 86 is arranged on the right-side platen 11-1, a facing left page 87 is arranged on the left-side platen 11-2, and a facing upper side 88 is arranged at the end 21 of the platen 11. At this time, the reading unit 14 moves from the upper side 88 of the book 85 toward a lower side 89 following an arrow 90, stops once when having reached the lower side 89, and moves to the home position 22. A book 91 smaller than the book 85 is also placed on the platen 11 similarly to the book 85 at the time of being read by the image reading apparatus 1. That is, the book 91 is placed on the platen 11 in such a manner that a facing right page 92 is arranged on the right-side platen 11-1, a facing left page 93 is arranged on the left-side platen 11-2, and a facing upper side 94 is arranged at the end 21 of the platen 11. At this time, the reading unit 14 moves from the upper side 94 of the book 91 toward a lower side 95 following an arrow 96, stops once when having reached the lower side 95, and moves to the home position 22, similarly to the time of reading the book 85.

FIG. 9 indicates that a moving distance by which the reading unit 14 moves at the time of reading the book 91 is shorter than a moving distance by which the reading unit 14 moves at the time of reading the book 85. That is, the image reading apparatus 1 can stop the movement of the reading unit 14 at an edge of a document detected by the reading-range detecting sensor 66, thereby enabling to move the reading unit 14 only by a moving distance corresponding to the size of a document. Therefore, the image reading apparatus 1 can reduce a moving distance by which the reading unit 14 moves as compared with other image reading apparatuses that move the reading unit 14 by a certain distance even when documents having various sizes are to be read.

Because the reading unit 100 of the comparative example described above can move in parallel to the axial direction of the rotary axis 52, the reading unit 100 needs to move a length of a horizontal width in which the facing right and left pages are placed side by side, at the time of reading the book 85. Generally, in the book 85, the horizontal width in which the facing right and left pages are placed side by side is long and horizontally long as compared with the vertical width being vertical to the horizontal direction. In this case, the reading unit 100 of the comparative example described above needs to move a longer distance than the moving distance of the reading unit 14. The reading unit 100 of the comparative example needs to move in a region in which the book 85 is not arranged, when the home position is set at an end away from the book 85. On the other hand, the reading unit 14 does not move in a region where a document is not arranged at the time of reading the document, because the home position 22 is arranged above the end 21 of the platen 11. That is, in the image reading apparatus 1, the sub-scanning direction 60 is vertical to the direction in which the left-side platen 11-2 and the right-side platen 11-1 are placed side by side. Therefore, as compared with the image reading apparatus including the reading unit 100 of the comparative example described above, a moving distance of the reading unit 14 can be reduced. By reducing the moving distance of the reading unit 14, the image reading apparatus 1 can reduce the time required for reading and can decrease power consumed for moving the reading unit 14. Because power consumption is decreased, the image reading apparatus 1 can increase the quantities of documents that can be read when the battery 71 is charged to a predetermined capacity.

Effect of First Embodiment

In this manner, the image reading apparatus 1 includes the platen 11, the copyholder 12, and the reading unit 14. The copyholder 12 rotates around the rotary axis 52. The reading unit 14 is supported by the copyholder 12 to be able to move in a direction not parallel to the rotary axis 52 and reads a reading surface pressed against the copyholder 12, of a document placed on the platen 11. In the image reading apparatus 1, because the reading unit 14 supported by the copyholder 12 can move in the direction not parallel to the rotary axis 52 of the copyholder 12, the reading unit 14 can approach the rotary axis 52 or move away from the rotary axis 52 of the copyholder 12. When the copyholder 12 is opened or closed, the image reading apparatus 1 causes the reading unit 14 to approach the rotary axis 52, thereby enabling to reduce an operating force required at the time of opening or closing the copyholder 12.

The image reading apparatus 1 further includes the driving unit 61, the HP sensor 68, and the controller 18. The driving unit 61 moves the reading unit 14 with respect to the copyholder 12. The HP sensor 68 detects whether the reading unit 14 is arranged at the home position 22 near the rotary axis 52. The controller 18 controls the driving unit 61 to move the reading unit 14 to approach the rotary axis 52 when the reading unit 14 is not arranged at the home position 22, so that the reading unit 14 is arranged at the home position 22. By automatically moving the reading unit 14 to the home position 22, the image reading apparatus 1 does not need to perform an operation to move the reading unit 14 to the home position 22 and can reduce an operating force easily. It is preferable that the automatic movement of the reading unit 14 is performed at the time of activating the image reading apparatus 1.

If the reading unit 14 is not arranged at the home position 22 after the reading unit 14 reads a reading surface, the controller 18 controls the driving unit 61 so that the reading unit 14 approaches the rotary axis 52. The image reading apparatus 1 can easily reduce an operating force to open or close the copyholder 12, for example, when a document to be read is replaced or a page is turned over, by automatically moving the reading unit 14 to the home position 22 after completion of reading.

The image reading apparatus 1 also includes the opening/closing sensor 69 that detects opening or closing of the copyholder 12. At this time, when the copyholder 12 is closed to be pressed against a document, the controller 18 controls the driving unit 61 so that the reading unit 14 reads a reading surface. Therefore, the image reading apparatus 1 does not need to perform an operation to start reading, separately from opening or closing of the copyholder 12, and can easily start reading of an image.

The image reading apparatus 1 also includes the reading-range detecting sensor 66 that detects a specified reading region of a reading surface. At this time, the controller 18 controls the driving unit 61 so that the reading unit 14 does not read a region other than the reading region. Therefore, the image reading apparatus 1 can reduce the distance by which the reading unit 14 moves, because the reading unit 14 does not move in a region other than a reading region so that the reading unit 14 does not read the region other than the reading region. Because the distance by which the reading unit 14 moves is reduced, the image reading apparatus 1 can reduce the reading time for reading one document and can increase the quantities of documents that can be read per unit time. Because the distance by which the reading unit 14 moves is reduced, the image reading apparatus 1 can decrease power required for moving the reading unit 14. By decreasing power to be consumed, the image reading apparatus 1 can increase the quantities of documents that can be read per unit discharge capacity of the battery 71.

In the first embodiment, a two-dimensional sensor is exemplified as the reading-range detecting sensor 66. However, a sensor other than the two-dimensional sensor can be used as the reading-range detecting sensor 66. A reflective sensor can be exemplified as such a sensor. The reflective sensor is used together with a reflective plate placed near a lower edge of a document placed on the platen 11. The reflective sensor emits light toward a document placed on the platen 11 and detects reflected light of the light reflected by the reflective plate, to detect a timing at which the image sensor 65 stops reading of the document. Even if such a reflective sensor is used as the reading-range detecting sensor 66, the image reading apparatus 1 can reduce the distance by which the reading unit 14 moves. The image reading apparatus 1 according to the first embodiment reduces the moving distance of the reading unit 14 by using the reading-range detecting sensor 66. However, it is permissible that the moving distance of the reading unit 14 is not reduced by omitting the reading-range detecting sensor 66. Even if the reading-range detecting sensor 66 is omitted and the moving distance of the reading unit 14 is not reduced, the image reading apparatus 1 can reduce an operating force for opening the copyholder 12 by arranging the reading unit 14 at the home position 22.

The image reading apparatus 1 according to the first embodiment moves the reading unit 14 to the home position 22 by using the driving unit 61 at the time of activation or completion of reading. However, a user can move the reading unit 14 to the home position 22. Even in this case, the image reading apparatus 1 can reduce an operating force for opening the copyholder 12 by arranging the reading unit 14 at the home position 22.

The image reading apparatus 1 according to the first embodiment starts a reading operation by using closure of the copyholder 12 as a trigger at Step S7 in the flowchart in FIG. 7. However, the image reading apparatus 1 according to the first embodiment can start the reading operation triggered by a factor other than opening or closing of the copyholder 12. For example, the controller 18 can start the reading operation when a reading instruction is received from the display unit 81 via wireless communication.

Other embodiments will be explained below with reference to the accompanying drawings.

Second Embodiment

Another Home Position

Figure 10:
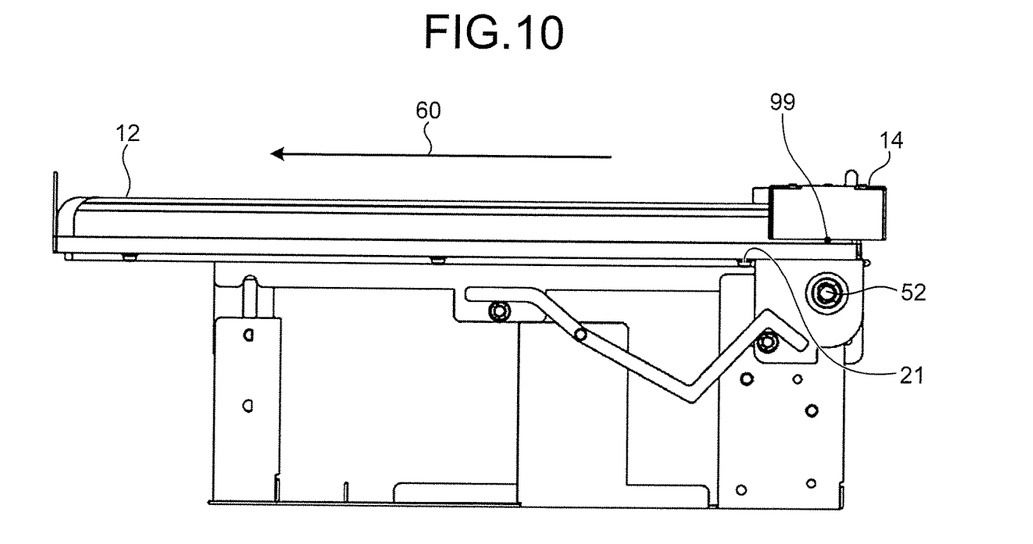
FIG. 10 is a side view depicting a copyholder and a reading unit according to a second embodiment.

The home position 22 can be arranged on the side farther from the handle 59 than the end 21 of the platen 11. FIG. 10 is a side view depicting a copyholder and a reading unit according to a second embodiment. A home position 99 is located generally above the copyholder 12 when the copyholder 12 is closed, as depicted in FIG. 10. In this case also, the copyholder 12 restricts movement of the reading unit 14 so that the reading unit 14 does not move far from the handle 59 when the reading unit 14 is arranged at the home position 99. At this time, upon reception of a reading instruction from a user, the controller 18 controls the driving unit 61 to move the reading unit 14 toward the handle 59 in parallel to the sub-scanning direction 60 at a predetermined speed. The controller 18 then controls the image sensor 65 to start reading of reading lines on a reading surface at a timing at which the reading unit 14 passes the end 21 of the platen 11. Thus, the image reading apparatus 1 can read a document appropriately even when the home position 99 is adopted thereto.

A force of the reading unit 14 counteracting an operating force to open the copyholder 12 decreases when the reading unit 14 is arranged at the home position 99 than that when the reading unit 14 is arranged at the home position 22 described above. Therefore, the image reading apparatus 1 adopting the home position 99 can further reduce an operating force to push up the handle 59 when a user opens the copyholder 12, as compared with the image forming apparatus 1 adopting the home position 22 described above.

The home position can be arranged on the side farther from the handle 59 than the rotary axis 52 of the copyholder 12. The force of counteracting the operating force to open the copyholder 12 decreases when the reading unit 14 is arranged on the side farther from the handle 59 than the rotary axis 52 of the copyholder 12 than that when the reading unit 14 is arranged at the home position 99 described above. Therefore, the image reading apparatus 1 adopting the home position arranged on the side farther from the handle 59 than the rotary axis 52 of the copyholder 12 can further reduce an operating force to push up the handle 59 when a user opens the copyholder 12.

In the image reading apparatus 1, the sub-scanning direction 60 is vertical to the rotary axis 52 of the copyholder 12. However, it is permissible as far as the sub-scanning direction 60 is not parallel to the rotary axis 52 of the copyholder 12. Even if the sub-scanning direction 60 is not parallel to the rotary axis 52 of the copyholder 12 and is inclined at an angle, the image reading apparatus 1 can reduce an operating force to open the copyholder 12, because a distance between the center of gravity of the reading unit 14 and the rotary axis 52 of the copyholder 12 changes.

In the image reading apparatus 1, the platen does not need to be formed of the right-side platen 11-1 and the left-side platen 11-2 and can include only one platen. In the image reading apparatus 1, the interlocking mechanism 53 can be omitted. In the image reading apparatus 1, the platen can be formed such that a placing surface of the platen does not move up and down and is fixed to the base 10. Further, the case 2 can be omitted in the image reading apparatus 1.

According to the disclosed modes, a force required to open and close a copyholder can be reduced, thereby reducing load on a user.

All examples and conditional language recited herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although the embodiments have been described in detail, it should be understood that the various changes, substitutions, and alterations could be made hereto without departing from the spirit and scope of the disclosure.

What is claimed is:

1. An image reading apparatus comprising:
a platen;
a copyholder configured to rotate around a rotary axis;
a reader configured to read a reading surface pressed against the copyholder, of a document placed on the platen and to be supported by the copyholder to be able to move in a direction not parallel to the rotary axis;
a driver configured to move the reader with respect to the copyholder;
a home position sensor configured to detect whether the reader is arranged at a home position near the rotary axis; and
a controller configures to control the driver to cause the reader to approach the rotary axis so that the reader is arranged at the home position, when the reader is not attached at the home position after activation of the image reading apparatus.

2. An image reading apparatus comprising:
a platen;
a copyholder configured to rotate around a rotary axis;
a reader configured to read a reading surface pressed against the copyholder, of a document placed on the platen and to be supported by the copyholder to be able to move in a direction not parallel to the rotary axis;
a driver configured to move the reader with respect to the copyholder;
a home position sensor configured to detect whether the reader is arranged at a home position near the rotary axis;
a controller configured to control the driver to cause the reader to approach the rotary axis so that the reader is arranged at the home position, when the reader is not arranged at the home position after activation of the image reading apparatus; and
a reading-range detecting sensor configured to detect a specified reading region of the reading surface, wherein
the controller controls the driver so that the reader does not read a region other than the reading region.

3. The image reading apparatus according to claim 2, wherein
the controller controls the driver so that the reader approaches the rotary axis when the reader is not arranged at the home position after the reader has read the reading surface.

4. The image reading apparatus according to claim 2, further comprising an opening/closing sensor configured to detect opening or closing of the copyholder, wherein
when the copyholder is closed to press the copyholder against the document, the controller controls the driver so that the reader reads the reading surface.

5. An image reading method executed by using an image reading apparatus including
a platen,
a copyholder configured to rotate around a rotary axis,
a reader configured to read a reading surface pressed against the copyholder, of a document placed on the platen,
a driver configured to move the reader with respect to the copyholder,
a sensor configured to determine whether the reader is arranged at a home position, and
a reading-range detecting sensor configured to detect a specified reading region of the reading surface,
the method comprising:
determining whether the reader is arranged at a home position by using the sensor;

arranging the reader at the home position by causing the reader to approach the rotary axis by using the driver, when the reader is not arranged at the home position; and controlling the driver so that the reader does not read a region other than the reading region.

* * * * *